United States Patent [19]
Faltinowski

[11] Patent Number: 4,815,235
[45] Date of Patent: Mar. 28, 1989

[54] BEAR CONTROL DEVICE

[76] Inventor: John D. Faltinowski, 17037 St. Charles St., Nunica, Mich. 49448

[21] Appl. No.: 102,727

[22] Filed: Sep. 30, 1987

[51] Int. Cl.4 .............................................. A01G 17/12
[52] U.S. Cl. ........................................................ 47/24
[58] Field of Search ............................................ 47/24

[56] References Cited

U.S. PATENT DOCUMENTS

| | | | |
|---|---|---|---|
| 54,232 | 4/1866 | Tufts . | |
| 174,114 | 2/1876 | Bryan | 47/24 |
| 205,515 | 7/1878 | Culin . | |
| 442,095 | 12/1890 | Bessel . | |
| 654,889 | 7/1900 | Gosselin . | |
| 727,054 | 5/1903 | Arndt | 47/24 |
| 1,286,416 | 12/1918 | Rix . | |
| 1,353,404 | 9/1920 | Libby . | |
| 1,512,618 | 10/1924 | McDonald . | |
| 1,654,028 | 12/1927 | Wilson et al. | 47/24 |
| 1,996,894 | 4/1935 | Alvord . | |
| 3,611,651 | 10/1971 | Carlson . | |
| 4,073,090 | 2/1978 | Lucia . | |
| 4,110,943 | 9/1978 | Carlson . | |
| 4,471,562 | 9/1984 | Brucker . | |
| 4,637,164 | 1/1987 | Brown . | |

FOREIGN PATENT DOCUMENTS

| | | | |
|---|---|---|---|
| 54235 | 11/1890 | Fed. Rep. of Germany | 47/24 |
| 612667 | 5/1935 | Fed. Rep. of Germany | 47/24 |
| 656563 | 2/1938 | Fed. Rep. of Germany | 47/24 |
| 193279 | 12/1937 | Switzerland | 47/24 |

OTHER PUBLICATIONS

"Deer Me" advertisement for tree steps in Jul., 1987 Issue of *Bowhunter.*

*Primary Examiner*—Deborah L. Kyle
*Assistant Examiner*—Richard W. Wendtland
*Attorney, Agent, or Firm*—Price, Heneveld, Cooper, DeWitt & Litton

[57] ABSTRACT

A device and method of use for protecting hunters and the like from attack by dangerous animals such as bears. The device has a body that fits around the perimeter of a tree trunk and control means attached thereto for discouraging a bear from climbing the tree. In one embodiment the body is divided into hinged body portions that can be fitted around a tree and closed by a clasp. In another embodiment the body consists of a plurality of bases that are strung together and retained to a tree by a belt. The device is fitted to the trunk of a tree which is climbed by the hunter. The device discourages the bear from climbing the tree.

14 Claims, 2 Drawing Sheets

54
58
52
64
62
54
70
68
68
66
62
60
36
26

54'
58'
VI
72
72
52'
74
76a
76b
26
VI
36

50
52
70
54
54
70
26
26
112
IV
54
70
70
56
26

58'
54'
52'
28
34
80a
76
78
80b
36

BEAR CONTROL DEVICE

BACKGROUND OF THE INVENTION

This invention relates to protection devices and in particular to a device and method of use for protecting hunters, backpackers and objects from dangerous animals, such as bears.

Certain species of black bear are capable of climbing trees and have been known to attack hunters in a tree stand. Tree stands are popular for bear hunting because they elevate the hunter so that the hunter's scent stays above the nose level of the bear. However, a tree stand provides a false sense of security in certain areas populated by black bear that are capable of climbing trees.

Sportsmen, on the ground, are additionally subject to bear attacks and additionally have no safe refuge, such as climbing a tree, if the bear is of the type that can also climb a tree. Further, bears may climb a tree to take a dressed deer, or the like, hung from a limb for airing.

SUMMARY OF THE INVENTION

The present invention provides a method and apparatus for protecting an object, such as a hunter, backpacker or fresh animal meat, from animals. A bear control device, according to the invention, has a body that fits around the perimeter of a tree trunk and control means attached thereto for discouraging a bear from climbing the tree. A plurality of openings may be provided around the body, extending radially outwardly from the tree trunk, for mounting the control means. Each control means may have a central portion within an opening that is fastened thereto by fastening means having adjustment means so that the control means is longitudinally adjustable within the opening. Each control means may further have an inner portion that can be adjusted by the adjustment means into abutting relationship with the tree to allow the device to be used with various diameter trunks. The control means may further have an outwardly extending portion, such as a pointed spike, to discourage a bear from attempting to climb past the control means. The inner portion of the control means abutting the tree trunk retains the control device from sliding on the trunk and provides increased strength to the control means when rammed by a bear. The inner portion increases its engagement with the trunk when the device is canted due to the force of a bear against it.

In a method according to the invention, a tree is selected sufficiently large to support an object and the object is placed in the tree at a location beyond the reach of bears. A device is installed on the trunk of the tree to discourage bears from climbing the tree. In one embodiment of the invention, the object is an individual human and the control device is partially installed on the tree, leaving a path for the individual to climb the tree. Once in the tree, beyond the control device, the individual completes installation of the device. In another embodiment, the control device consists of a plurality of control devices strung together on a flexible belt that can be rapidly installed to a tree by a backpacker, or the like, who is being pursued by a bear. These and other objects, advantages and features of this invention will become apparent upon review of the following specification in conjunction with the drawings.

DESCRIPTION OF THE PREFERRED EMBODIMENT

Figure 1:
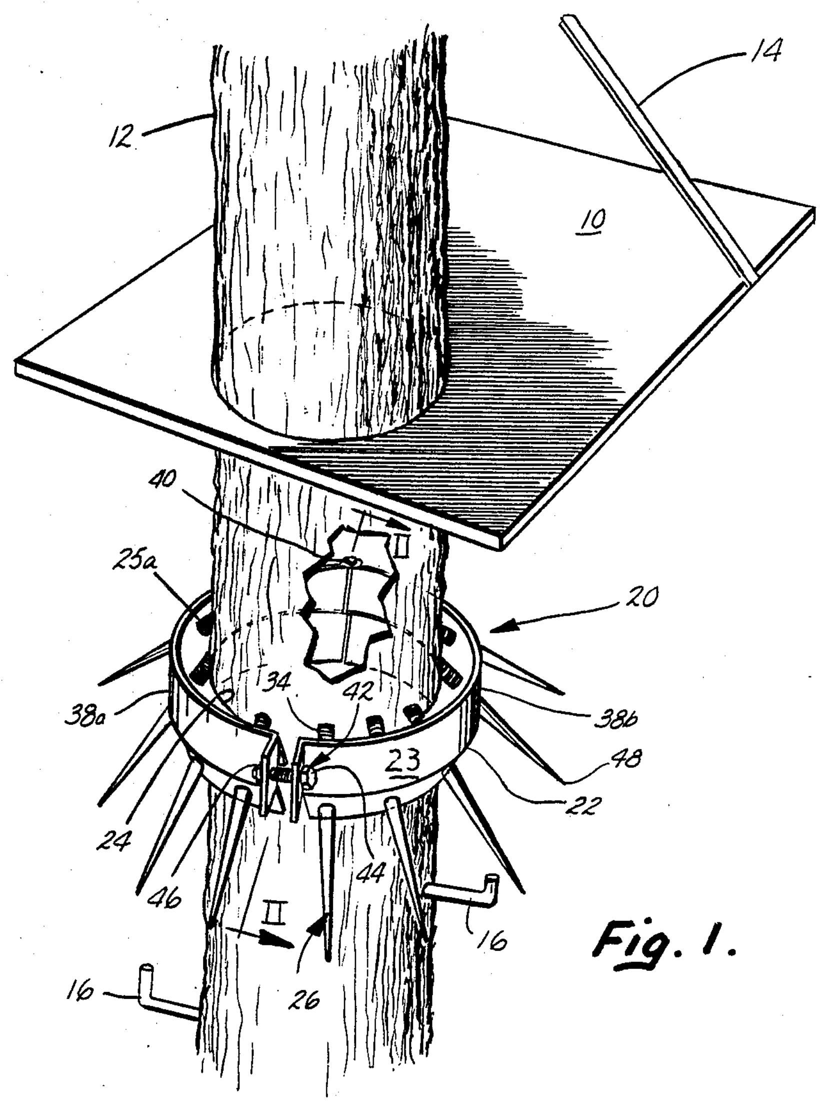
FIG. 1 is a perspective view of an apparatus according to the invention installed on a tree.

Referring now specifically to the drawings, and the illustrated embodiments depicted therein, a tree stand is illustratively shown to include a platform 10 mounted to the trunk 12 of a tree and having multiple support members 14, of which only one is shown. A plurality of steps 16 are fastened to the trunk by known techniques and provide access to platform 10.

In order to control a bear and discourage him from climbing trunk 12, a bear control device 20 is provided. Device 20 has a body 22 that includes a wall 23 defining a circular aperture 24 having a diameter at least as large as the largest trunk to which the device will be installed. A plurality of control means 26 are attached to body 22 and spaced around the perimeter of the tree.

Figure 2:
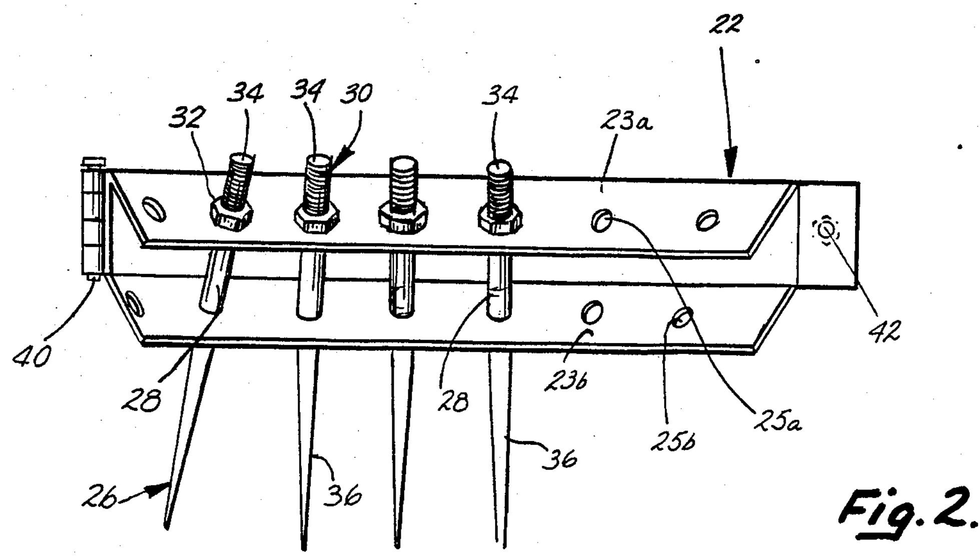
FIG. 2 is a sectional view taken along the lines II—II in FIG. 1.

Body wall 23 has generally parallel wall portions **23*a* and 23*b* having means for defining pairs of aligned openings 25*a* and 25*b* therein. Openings 25*a* and 25*b* are aligned radially from the trunk and provide an opening through body 22 in which a control means 26 is disposed. Each control means has a middle portion 28 (FIG. 2) that is disposed in the corresponding opening and is attached to body 22 by fastening means generally shown at 30. Fastening means 30, in the illustrated embodiment, includes a threaded nut 32 and corresponding threads on middle portion 28. Accordingly, fastening means 30 additionally provides adjustment means for control means 26 to be longitudinally adjusted with respect to body 22 by rotation of middle portion 28. A portion of the control means (not shown) may be configured with opposing flat surfaces in order to facilitate a wrench engaging and rotating the control means to adjust its longitudinal position. Control means 26 additionally has an inner portion 34 and an outer, control portion 36**.

Control device 20 may be fitted on the trunk of any tree smaller than the diameter of aperture 24 provided the tree is sufficiently strong to support an individual. By longitudinally adjusting the control means 26 inwardly or outwardly, the control device may be adapted to various diameter trees. Body 22 is divided into two body portions **38*a* and 38*b* (FIG. 1). The body portions are joined at adjacent portions on one side by a hinge 40 and on the other side by a clasp 42. Clasp 42 preferably has guard means for preventing a bear from opening the clasp. In the illustrated embodiment, the clasp includes a bolt 44 and nut 46. Because of the complex grasping and turning motion necessary to uncouple the nut 46 from the bolt 44**, these members provide the above-mentioned guard means.

In order to provide protection for a person, the bear control device 20 is attached to the tree by opening clasp 42, pivoting body portions 38*a*, 38*b* apart about hinge 40, fitting the body portions around the trunk and closing clasp 42. The middle portions 28 of the control means 26 are sequentially rotated until inner portions 34 snugly abut trunk 12 of the tree. During this portion of the assembly procedure, three or four adjacent control means 26 may be left uninstalled. The person now climbs steps 16 to mount platform 10. Once on platform 10, the person may lean over the edge and install the remaining three or four control means 26 into body 22 until inner portions 34 are abutting the tree.

Control means 26 are, in the illustrated embodiment, approximately one-half inch diameter steel spikes that terminate at their outer portion in a pointed tip 48. The purpose of tip 48 is to discourage an animal, such as a bear, from climbing the tree. In addition, should the bear persist in attempting to climb the tree, the force of the bear against control means 26 will force inner portions 34 against trunk 12. This canting motion of the control device 20 will prevent the device from sliding along the tree trunk for any appreciable distance and will cause the inner portions of the control devices being pressed-against by the bear to firmly engage the trunk to provide additional resistance to the control devices than may be obtained from the body 22 alone.

Figure 3:
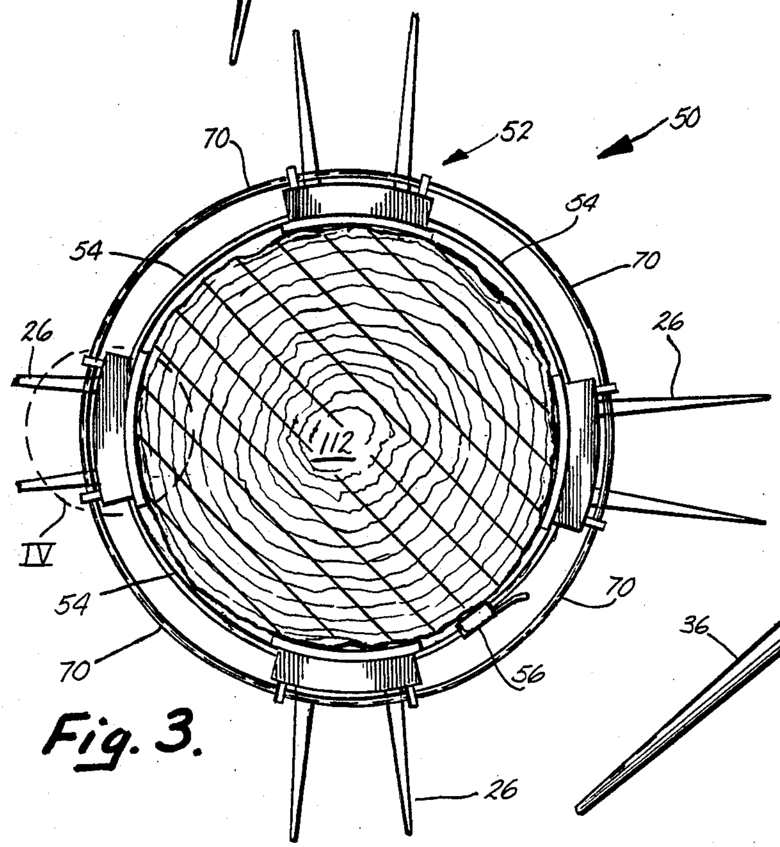
FIG. 3 is a top view of an alternative embodiment shown installed on a tree.

In an alternative embodiment, shown in FIG. 3, a bear control system 50 includes a plurality of control devices 52 spaced about the perimeter of tree trunk 112. The control devices 52 are retained to the tree trunk by a flexible member, such as a belt 54, which strings through each control device and is coupled at a clasp 56. Clasp 56 provides for adjustment to the belt to allow it to interface with a range of tree sizes. Clasp 56 additionally has integral protection means for preventing a bear from opening the clasp. Such a belt 54 and clasp 56 are manufactured by Arrow Star Co. under Model No. LC4200.

Figure 4:
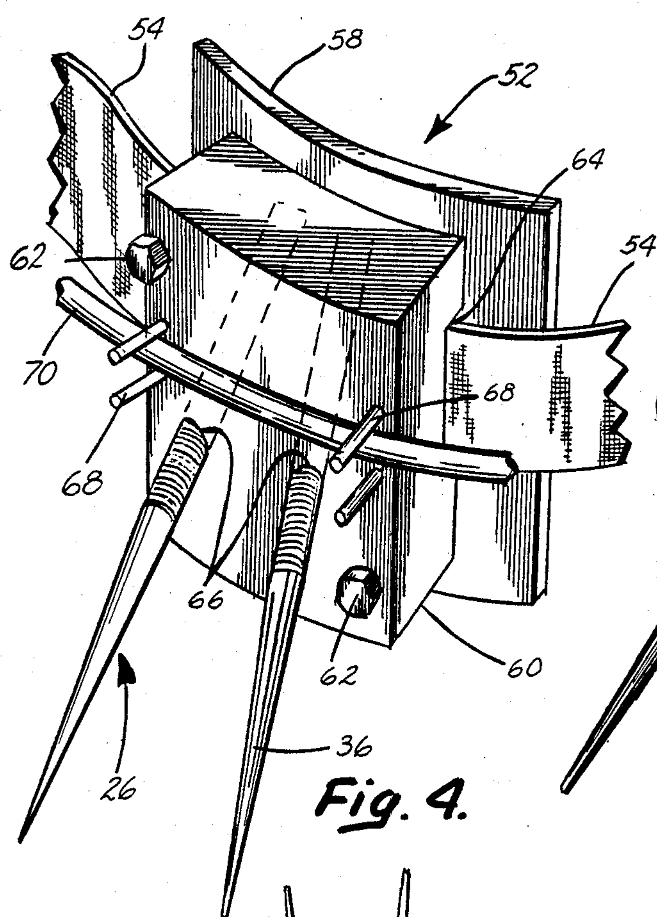
FIG. 4 is an enlarged perspective view of one of the control devices in FIG. 3.

Referring to FIG. 4, each control device 52 has a base 58 and a block 60 mounted to base 58 by a plurality of bolts 62. A channel 64 formed at the interface between block 60 and base 58 provides a passage to string belt 54 through device 52. A pair of openings 66 extend entirely through block 60 and base 58 and have a control means 26 disposed therein. In this embodiment, it is contemplated that the inner surface of openings 66 will be threaded to provide fastening means for fastening control means 26 to block 60 and adjustment means for providing longitudinal adjustment of the control means within the openings. Pins 68 extending from block 60 provide a guide for a metal cable or chain 70. The purpose of cable 70 is to provide backup retention means, in case a bear severs belt 54, which will be typically made of leather or nylon. In this embodiment, the base 58 may be made of steel or aluminum and block 60 of aluminum or reenforced plastic.

The embodiment shown in FIGS. 3 and 4 is compact and lightweight and easy to retain to a tree. Accordingly, it is contemplated that this embodiment would be carried by a camper or a backpacker in bear country and assembled to a tree trunk by stringing the system 50 around the tree and closing clasp 56, with belt 54 then adjusted to the diameter of the tree trunk. It is anticipated that the person would climb the tree and reach down behind it to install the device. The vertical length of base 58 will provide stability to prevent the force exerted on control means 66 by a bear from rotating the control device 52 excessively about belt 54

Figure 5:
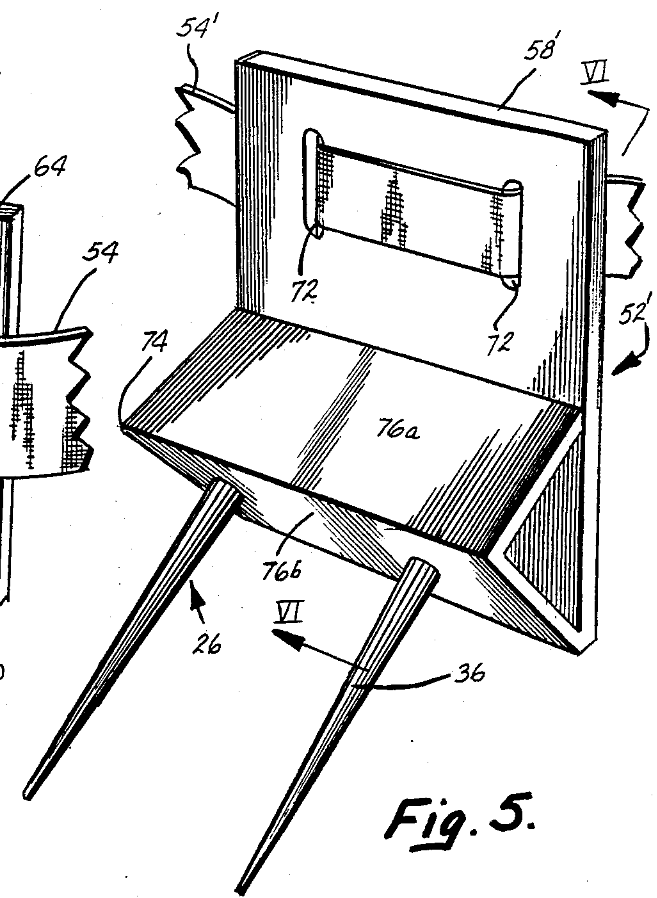
FIG. 5 is the same view as FIG. 4 of another alternative embodiment of the invention.
Figure 6:
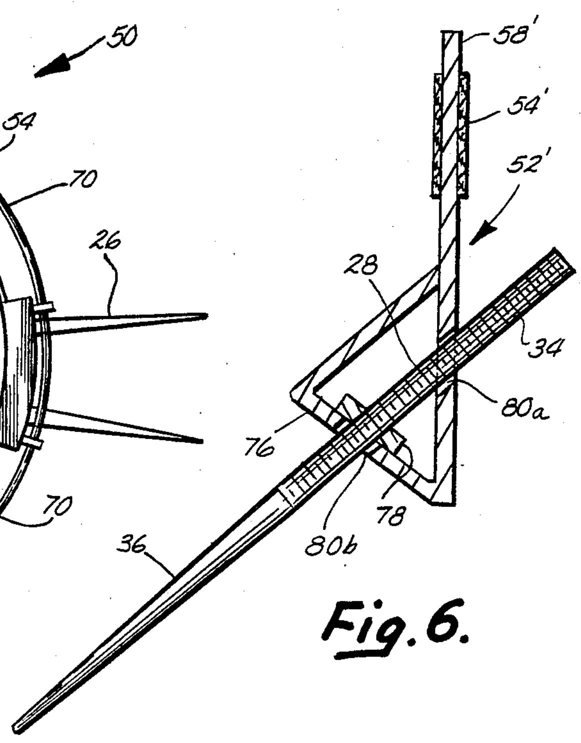
FIG. 6 is a sectional view taken along the lines VI—VI in FIG. 5.

An alternative to control device 52 is shown in FIGS. 5 and 6. In this embodiment, base 58' is shown to be substantially flat and has a pair of slots 72 formed therein to string the device on belt 54'. An angle member 74 has a pair of side members 76*a* and 76*b* that are joined at one end thereof to each other and at opposite ends thereof to base 58' as by welding, or the like. In this embodiment, base 58' and angle member 74 are steel. As seen in FIG. 6, mid-portion 28 of control means 26 threadably engages a nut 78 welded to side member 76*b* to provide fastening means and adjustment means for middle portion 28. Aligned openings 80*a*, in base 58 and 80*b* in side member 76*b*, provide passage for control means 26.

The angle at which control means 26 are mounted with respect to the tree trunk is contemplated to be at approximately 35°–45°.

Changes and modifications in the specifically described embodiments can be carried out without departing from the principles of the invention. For example, instead of a spike terminating in a pointed tip, the control means could be a hypodermic needle for injecting a tranquilizing drug into a bear, for the purposes of examining the bear as part of a research project, etc. The invention, however, is intended to be limited only by the scope of the appended claims.

The embodiments of the invention in which an exclusive property or privilege is claimed are defined as follows:

1. A method of protecting an object from animals comprising:

selecting a tree sufficiently large to support the object;

locating the object in the tree beyond the reach of animals; and installing an animal control device on the trunk of said tree, said device having control means for discouraging animals from climbing said tree integral retaining means for retaining the device to said tree, said control means including a plurality of outwardly extending spikes, each one of said spikes having a central portion and an inner portion, said retaining means comprising a body surrounding said tree and fastening means for fastening the spike central portions to said body such that the spike inner portions engage the tree, said fastening means comprising means for defining a plurality of spaced through-openings in said ring and thread means on said through-openings and on said spike central portions for adjustably fastening said central portions to said through-openings.

2. A bear control system for attachment to the trunk of a tree comprising:

a body having means defining a central aperture in said body as large as the largest trunk to which the system is to be applied;

bear control means for affecting the behavior of a bear extending through said body radially said aperture;

said bear control means having an outer portion for contacting a bear and an inner portion;

means defining a plurality of radial openings through said body to said aperture;

a middle portion for each said control means positioned between said inner and outer portions and disposed in one of said openings; and fastening means for fastening each said middle portion to said body, said fastening means including adjustment means for longitudinally adjusting each said middle portion in the respective said opening to make the respective said inner portion radially adjustable, whereby said inner portion may be adjusted to abut the trunk of a tree so that the bear control system may be adapted to various diameter trunks.

3. A bear control system for attachment to the trunk of a tree comprising:

a body having means defining a central aperture in said body as large as the largest trunk to which the system is to be applied, said body being divided into two body portions and having separable means for connecting said body portions together, said body portions including means defining aligned lateral passages and said separable means including a flexible belt extending through said passages;

bear control means for affecting the behavior of a bear extending through said body radially said aperture;

said bear control means having an outer portion for contacting a bear and an inner portion; and said inner portion being adjustable radially in said aperture, whereby said inner portion may be adjusted to abut the trunk of a tree so that the bear control system may be adapted to various diameter trunks.

4. The bear control system in claim 3 in which said belt has an adjustable clasp connecting opposite end portions thereof.

5. The bear control system in claim 3 further having a metal cable extending between said body portions.

6. The bear control system in claim 3 having more than two said body portions.

7. A bear control system for attachment to the trunk of a tree comprising:

a body having wall means defining a central aperture in said body larger than the tree trunk;

means defining a plurality of openings spaced around said body and extending through said wall;

control means for discouraging a bear from climbing the tree, each control means having a central portion in one of said openings and an inner portion extending inside said aperture; and adjustable fastening means for adjustably fastening each said central portion to the respective one of said openings to allow longitudinal adjustment of the control means in the openings, whereby said inner portions may be brought into engagement with the tree trunk to retain said device to the tree trunk by adjusting the fastening means.

8. The bear control device in claim 7 in which said fastening means include engaging threads on said central portions and said openings.

9. The bear control device in claim 7 in which said control means further include an outwardly extending spike portion terminating in a point.

10. The bear control device in claim 7 in which said body is laterally divided into two body sections joined at one pair of adjacent portions by hinge means and at a second pair of adjacent portions by a separable clasp member.

11. The bear control device in claim 10 further having a guard associated with said clasp member to prevent a bear from operating said clasp member.

12. A bear control system for attachment to the trunk of a tree comprising:

a plurality of control devices, each of said control devices including a base and control means extending from said base for discouraging a bear from climbing the tree, said base having means for defining an opening extending radially from the tree trunk through said base, the respective said control means being disposed in said opening, each said control means having a middle portion, fastening means for fastening said middle portion to the respective said opening and an inner portion, said fastening means including adjustment means for longitudinally adjusting the position of each said middle portion in the respective said opening, whereby said inner portion may be abutted with the tree trunk by adjusting said adjustments means; and retaining means for retaining said plurality of control devices to said tree spaced around the perimeter of said trunk.

13. The bear control system in claim 12 in which said adjustment means includes threads on said middle portion and a nut attached to said base around said opening.

14. A bear control system for attachment to the trunk of a tree comprising:

a plurality of control devices, each of said control devices including a base and control means extending from said base for discouraging a bear from climbing the tree, said base having means for defining an opening extending radially from the tree trunk through said base, the respective said control means being disposed in said opening, said base further including a plate and an angle member having two sidewalls connected together at one end thereof and connected to said plate at an opposite end thereof, said opening including means defining aligned holes in said base and one of said sidewalls; and retaining means for retaining said plurality of said control devices to said tree spaced around the perimeter of said trunk.

* * * * *